United States Patent Office 2,769,747
Patented Nov. 6, 1956

2,769,747

PROCESS OF SEPARATION OF SILICEOUS IMPURITIES FROM INSULIN SOLUTIONS

Lorne G. Sampson, Chicago, Ill., assignor to Armour and Company, Chicago, Ill., a corporation of Illinois No Drawing. Application February 18, 1953, Serial No. 337,690

4 Claims. (Cl. 167—75)

This invention relates to the separation of siliceous impurities from insulin solutions.

In co-pending application United States Serial No. 197,051, filed November 22, 1950, there is disclosed a method of recovering insulin from organic solvent extracts. The process is characterized by the step of adsorbing the insulin on a siliceous adsorbent or clay material. The organic solvent is separated from the adsorbent with the insulin thereon, and thereafter the insulin is eluted with water at an alkaline pH.

It has been found that the optimum pH range for the elution step in the above process is from about 10.5 to 11. However, elution at these high pH's causes a serious contamination of the eluate with dissolved siliceous impurities from the siliceous adsorbent. This undesirable result is even more pronounced when the elution is performed rapidly by vigorously agitating the eluting solvent and adsorbent, or forcing the solvent through a packed body of the adsorbent. In other words, relative movement between the eluting solution (eluant) and adsorbent, which is very desirable for rapid and complete elution, has an attrition effect which contaminates the eluate with siliceous impurities. The problem is further complicated by the fact that insulin is denatured on prolonged contact with highly alkaline solutions, and therefore a minimum extraction time is important.

Prior to the recognition of the seriousness of the problem of siliceous impurity contamination, it was the practice to acidify the alkaline eluate and go directly from a pH, for example of around 10.5, to a pH of about 2.0. It has now been discovered that this procedure has the result of throwing the dissolved siliceous impurities out of solution and into a finely-dispersed colloidal form. Thus, the eluate at this point may contain from 3 to 4 times by weight of colloidal siliceous impurities as compared to the weight of insulin present.

There is evidence to indicate that the colloidal siliceous impurities adsorb substantial quantities of insulin, which are partially lost by the acid filtration of the acidified eluate prior to salting out of the insulin. It is estimated that from 10 to 20% of the insulin in the eluate may be lost in this manner. Further, not all of the colloidal siliceous impurities can be separated by ordinary clarification methods such as filtration, and therefore a substantial portion of the siliceous impurities will remain in the filtered eluate and will precipitate with the insulin in the salting out step. When the precipitate is reworked and purified by crystallization, the siliceous impurities will have a tendency to alter the isoelectric pH of the insulin, thereby interfering with the precipitation of the insulin. Moreover, with every acid filtration in subsequent processing of the insulin, further insulin losses will occur due to the adsorption of the insulin on siliceous impurities which are partially filtered out of the insulin.

It is therefore the principal object of this invention to provide a method for removing siliceous impurities from insulin solutions, which can be used as an additional step in the process described in the cited application Serial No. 197,051, and thereby substantially overcome the problems discussed above. Further objects and advantages will appear as the specification proceeds.

The method of this invention for the separation of siliceous impurities from insulin solutions is applicable to any aqueous solution of insulin containing dissolved silicates or similar siliceous impurities. Broadly, the method of this invention is characterized by the step of adjusting the pH of an aqueous solution of insulin containing dissolved siliceous impurities, such as silicates, to a pH within the range from 6.5 to 9.0 to form a flocculent precipitate from the siliceous impurities. Preferably, the pH of the aqueous solution is brought within the range from 7.5 to 8.5 to precipitate the silicates. In this manner, the silicates are thrown out of solution but not in the form of colloids. The insoluble siliceous material will slowly form as a flocculent precipitate which will settle to the bottom when the eluate is held within a container. The purified eluate (supernatant) can then be separated from the precipitate by ordinary clarification procedures such as decanting, filtration, and centrifugation.

Preferably, the procedure described above for separating siliceous impurities from an aqueous solution of insulin is integrated with the insulin recovery procedure described in co-pending application Serial No. 197,051. In this integrated procedure, the pancreas glands are extracted with a water-miscible organic solvent for insulin at a pH which keeps the proteolytic enzymes inactive and insolubilized, usually at a pH below 4. Various acids can be employed in the extraction, but the common ones are sulfuric acid, hydrochloric acid, and phosphoric acid. Ethanol is the organic solvent which is used almost exclusively in the United States, although other organic solvents such as methanol and acetone can also be employed. The organic solvent concentration in the extracting liquid is ordinarily from 50 to 85% by volume, the rest being water.

After the extraction, the spent pancreas residue is separated from the extract. As the next step in the recovery of insulin, it is necessary to convert the organic solvent solution to a substantially aqueous solution, that is, to reduce the concentration of organic solvent to a very low value. Prior to the process described in application Serial No. 190,751, this has been done by vacuum distillation, and one of the principal objectives of the process described in the cited application is to eliminate this vacuum distillation step. Therefore, in practicing the present invention as integrated with the process described in application Serial No. 197,051, the next step is to contact the organic solvent solution with a siliceous adsorbent to adsorb the insulin. Various clay adsorbents can be employed for this purpose, such as fuller's earth, kaolin, kieselguhr, diatomaceous earth, bentonite, montmorillonite, etc. The adsorption can be carried out at pH's within the range from 2 to 4, or in other words, at the same pH of the extracting medium. This step is described in greater detail in the cited co-pending application.

The clay adsorbent with the insulin thereon is separated from the organic solvent by filtration if a batch adsorption has been used. However, if the adsorption is carried out by passing the organic solvent extract through a column packed with the adsorbent material, the separation will automatically occur during the process.

If desired, although this step is optional, the adsorbent can be washed with a non-insulin eluting solvent, such as methylethylketone. Thereafter, or alternatively, the insulin is eluted by contacting an aqueous eluant at a pH from 9.5 to 13 with the adsorbent. Preferably, the pH of the water is in the range from 10 to 11.5, as this pH range has been found to be best for the rapid and complete elution of the insulin. Various alkaline reagents can be used to make the required pH adjustment, such as various inorganic bases or alkaline buffer salts. Ammonium hydroxide is particularly desirable, and excellent results are achieved by using ammonium hydroxide in combination with an alkaline buffer such as trisodiumphosphate. Other alkaline reagents can also be used, such as the alkali and alkaline earth metal hydroxides, as described in the cited co-pending application. Preferably, the elution is carried out by forcing the water through a packed body of the adsorbent, for example, by pumping water through cakes of the adsorbent held in a filter press or through a column packed with the adsorbent. The adsorbent is separated from the eluate, which will occur simultaneously when the eluant is forced through a body of the adsorbent, as preferred. The aqueous eluate thus obtained will contain a substantial amount of dissolved silicates in addition to the dissolved insulin. Therefore, it is preferred at this point to separate the dissolved silicates by the procedure previously described, in which the pH of the solution is preferably adjusted to within the range from 7.5 to 8.5. It is believed that it will not be necessary to repeat the details of this step since it has already been described.

After the separation of the fluocculent siliceous precipitate, the purified eluate is further processed to recover the insulin. For example, this can be done by adjusting the pH of the eluate to about pH 2, and subsequently salting out the insulin with sodium chloride. The details of these steps are well described in co-pending application Serial No. 197,051, and therefore it is believed that it will not be necessary to elaborate the procedure herein.

The method of this invention for separating siliceous impurities from insulin solutions has been found to be highly effective in that it permits substantially all of the siliceous impurities to be precipitated while at the same time substantially all of the insulin remains in solution and is not denatured or otherwise injured by the process.

Specific embodiments of this invention are illustrated in the following examples.

*Example I*

The principal steps of the preferred procedure for recovering insulin according to the method of this invention are as follows:

1. Extract the insulin from pancreas glands with 65% ethyl alcohol acidified to a pH of around 2.85 with phosphoric acid.
2. Adsorb the extracted insulin on a clay adsorbent such as "Super-Filtrol," which is a bentonite clay.
3. Separate the insulin adsorbate by filtration and washing with methylethylketone.
4. Elute the insulin from the adsorbent with aqueous ammonium and trisodiumphosphate at a pH of from 10.5 to 11.
5. Precipitate the silicates in the eluant by adjusting the pH thereof to 8.0, and allow to stand for at least one-half hour.
6. Separate the fluocculent precipitate from the eluate.
7. Acidify the eluate to pH 2, filter, and salt out the insulin with sodium chloride.

The crude salt cake thus obtained can be used as the starting material for insulin crystallization processes.

*Example II*

Approximately 250 pounds of beef pancreas glands were extracted with 65% ethyl alcohol acidified to a pH below 4 with phosphoric acid to obtain 160 gallons of insulin extract. The extract was roughly separated from the pancreas glands in a Bird centrifuge, brought to pH 8.0, filtered, and acidified to pH 3.5. The acidification causes a slight precipitation of fatty materials which does not interfere with the processing. The 160 gallons are heated to 40° C. with agitation in the jacketed glass-lined below tank (pot still). Directly then 20 pounds of "Super Filtrol" are added and the slurry is kept at 40° C. and under agitation for 2 hours. The insulin is adsorbed on the "Super Filtrol" along with most of the protein present and some of the fatty materials. The adsorption is shown by analysis to be complete. The adsorbent which carries the insulin is collected by filtration through 5 frames of a 12-inch Sperry press equivalent to 9.2 square feet of filtration area. A Moyno pump is used and pressures not greater than 50 p. s. i. are recommended. Following this filtration, the cake is blown with air to displace the liquid it contains. This enables a more efficient use of the solvent in subsequent washing of the press cake. The "Super Filtrol" press cake is washed while in the press by pumping 20 liters of either methylethylketone or 95% 3A ethyl alcohol at 35° C. through the press. The washed cake is blown dry with air and may be stored at room temperature for 24 hours without apparent damage to the insulin. The elution may be done from the cake as it remains in the press after collection and washing. However, the preferred method is to remove the cake from the press and slurry it in the first eluting solution. The first eluting solution consists of 18 liters of distilled water, 9 liters of concentrated ammonium hydroxide which is 28% ammonia, and 900 grams of commercial grade trisodiumphosphate [$Na_3PO_4(H_2O)_{10-12}$]. Water at 35° C. is used to prepare this solution. The cake is added to the warm solution and agitated for 15 minutes. If the operation is not enclosed, a gas mask to remove ammonia fumes is required by the operator. Immediately following the 15 minute period, the slurry is pumped into 6 frames (11 square feet filtration area) at a pressure not to exceed 40 pounds per square inch. A Moyno pump is used and in order to control the pressure a bypass with a valve is required. The pH at which the elution takes place is approximately 10.5–11 and some silicates are dissolved from the clay (Super Filtrol). The erosive effect resulting from driving of the eluting solution through the Super Filtrol cake in the press is the most important factor in the dissolving of silicates into the eluate. Pumping pressures as high as 80 to 140 p. s. i. give severe silicate contamination. As soon as the last trace of the slurry has left the vessel from which it was pumped, the second elution mixture is blown into the vessel. This solution at 35° C. consists of 80 liters of distilled water, 4 liters of concentrated ammonium hydroxide, and 0.5 kils. of trisodiumphosphate. Again, the pumping pressure is held below 40 p. s. i. The filtrate or eluate from the press is collected from both the first and second eluting steps in a jacketed glass-lined 50 gallon tank. Brine is circulated in the jacket to chill the eluate so that the temperature does not rise above 25° C. As the eluate is collected, it is periodically adjusted with 6 N sulphuric acid to a pH of 8.5 to 9.0. The overall time for both elution steps will be about 1.5 to 2.0 hours. The second eluting mixture is followed by air-blowing of the press to free the cake (which is discarded) from most of the retained ammonia. After all the eluate is collected the pH is adjusted to 8.0 with 6 N $H_2SO_4$ and the temperature to 20–22° C. At this stage, silicates will form as a floc which generally settles quite readily. In such case decanting and then filtration of the remains on a 12-inch Büchner funnel serves to separate the silicates. Otherwise, 200 grams of filter aid (Hiflo) is added to the eluate and the entire eluate is filtered through 3 frames of the 12-inch Sperry press using pump, vacuum, or air pressure, followed by blowing the press with air. The filter aid may adsorb insulin at pH 8.0 in the filtration of silicates.

The eluate from which silicates have been removed is acidified to pH 2.0–2.2 with 6 N sulphuric acid and filtered again through three frames of the 12-inch Sperry press. Approximately 200 grams of filter aid are used in this filtration by addition to the eluate. Blowing the press with air after a 10 liter wash with distilled water at pH 2.0 with sulphuric acid displaces all the eluate retained in the press. The resulting volume is about 35 gallons which, upon salting out by the addition of 2.5 pounds of sodium chloride per gallon of eluate, yields a salt cake of light fluffy texture. The salt cake is reworked following well known procedures to produce a highly purified insulin product.

The foregoing specific examples and detailed description have been given for the purpose of illustration only, and it is understood that this invention may be practiced in greatly different ways using any one of many varied procedures, all within the spirit of the invention.

I claim:

1. In a process for recovering insulin from pancreas glands wherein the extracted insulin is adsorbed on a clay adsorbent, the steps of eluting the adsorbed insulin by contacting the adsorbent with an aqueous eluant at a pH of from 9.5 to 13, thereby obtaining an aqueous solution of insulin containing dissolved siliceous impurities, adjusting the pH of said solution to a pH within the range from 6.5 to 9.0, maintaining said solution at said adjusted pH until said siliceous impurities have been formed into a fluocculent precipitate, and separating said precipitate from said solution.

2. The method of claim 1 in which said siliceous impurities are precipitated by adjusting the pH of the aqueous eluant within the range from 7.5 to 8.5.

3. In a process for recovering insulin from pancreas glands wherein the extracted insulin is adsorbed on a clay adsorbent, the method of obtaining insulin substantially free of siliceous impurities, characterized by the steps of eluting the adsorbed insulin by contacting the clay adsorbent with water at a pH from 10 to 11.5, thereby obtaining a water solution of insulin containing dissolved silicates, adjusting the pH of said solution to within the range from 7.5 to 8.5, maintaining said solution at said adjusted pH until said dissolved silicates have been formed into a fluocculent precipitate, and separating said precipitate from said solution.

4. In a process for recovering insulin from pancreas glands wherein the extracted insulin is adsorbed on a clay adsorbent, the steps of eluting the adsorbed insulin by forcing water at a pH of 10 to 11.5 through a packed body of the adsorbent, thereby obtaining an aqueous eluate containing dissolved silicates, adjusting the pH of said eluate to within the range from 7.5 to 8.5, maintaining said solution at said adjusted pH until said dissolved silicates have been formed into a fluocculent precipitate, and separating said precipitate from said solution.

References Cited in the file of this patent

Sandberg et al.: Soc. Exptl. Biol. & Med. Proc., vol. 23, 1926, pp. 317 and 318.

Searle: Chemistry and Physics of Clays, second edition, 1933, Ernest Benn Limited, London, pp 14, 15, 16, 17, 308, 309